May 12, 1959
J. T. BEESTON, JR
2,885,873
TORQUE LIMITING MAGNETIC COUPLING
Filed June 24, 1957
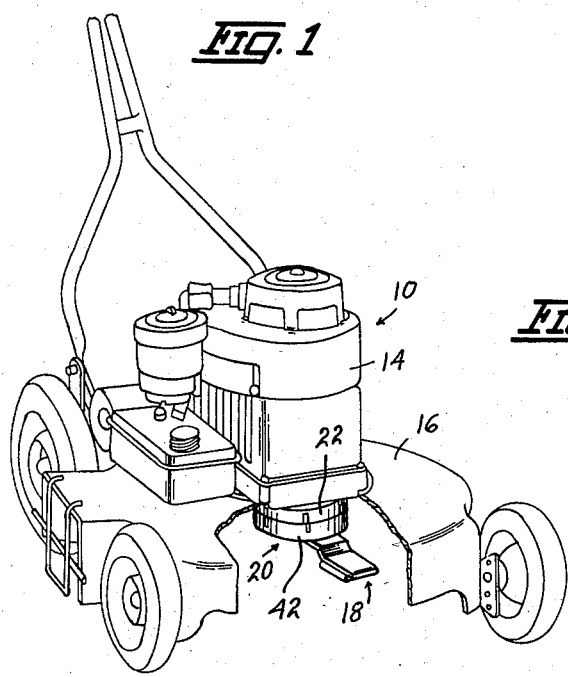
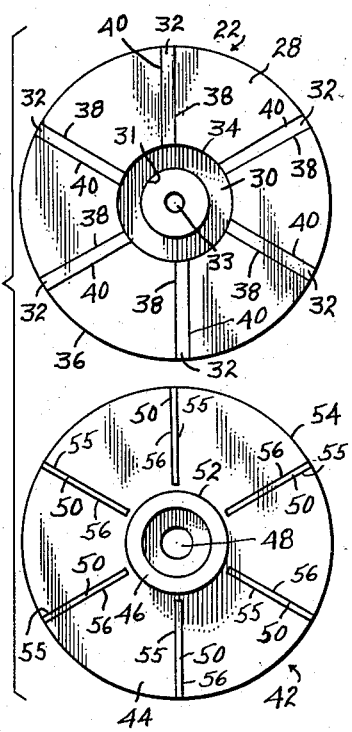
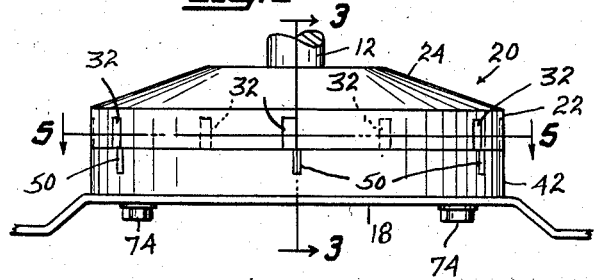
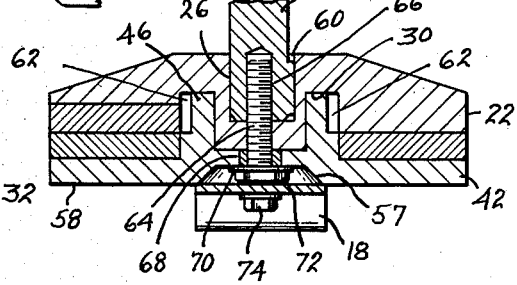
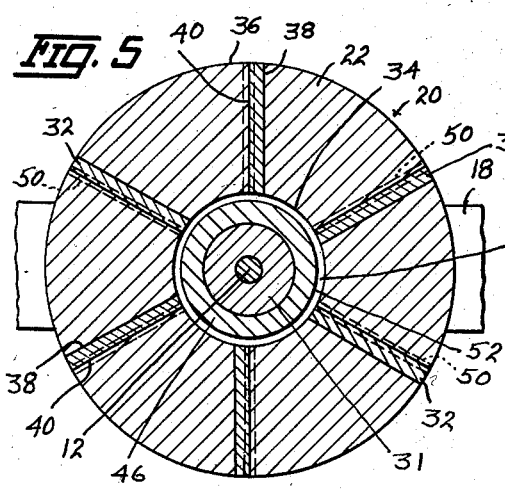
INVENTOR.
JOHN T. BEESTON, JR.
BY *Morton S. Adler*
ATTORNEY.

United States Patent Office 2,885,873
Patented May 12, 1959

2,885,873

TORQUE LIMITING MAGNETIC COUPLING

John T. Beeston, Jr., Des Moines, Iowa, assignor to Frontier Development Company, Des Moines, Iowa, a corporation of Iowa Application June 24, 1957, Serial No. 667,590

11 Claims. (Cl. 64—28)

My invention relates to the use of permanent magnets in coupling a driving member to a driven member and is particularly designed for, though not necessarily limited to, the cutting blade of a rotary type lawn mower.

One of the important objects herein is to provide a magnetic slip coupling between the driving and driven member whereby the blade on the driven member can slip relative to the driving member attached to the motor shaft when an obstruction is encountered and thereby reduce the sudden torque or strain on such shaft.

Another object contemplated is the provision of a slip type coupling wherein unrestricted relative movement of the coupling elements is prevented by magnetic forces.

Sudden stops by a blade on a rotary lawn mower create an energy flow to the motor shaft usually of greater proportions than the machine can stand and thus can cause expensive breakdowns and disabilities. It thus becomes desirable in this type of machine, as well as in others, to provide control means for automatically determining the limited working capacity thereof. For this purpose, power sensing elements placed at proper places in a machine will reveal the total energy flow or the amount that flows through any part and the output from such power sensing elements is used to limit the energy flow or to close down the machine entirely. In this respect I have used permanent magnetic fields in a slip type coupling to provide a torque limiting control means between the motor and the driven blade.

Another important object herein is the provision of a slip coupling or clutch of the above class that will automatically de-couple a load from a power source when such load reaches a design value greater than that of such power supply and will automatically re-couple said load to the power source when the load has assumed a safe design value therefor.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is a perspective view of a rotary type lawn mower cut away to illustrate the operating position of my magnetic coupling, Fig. 2 is an enlarged elevational view showing a preferred embodiment of this invention, Fig. 3 is a cross sectional view taken on the line 3—3 of Fig. 2, Fig. 4 is a plan view showing the respective driving member (top) and driven member (bottom) illustrated to disclose their normally abutting surfaces, and Fig. 5 is a cross sectional view taken on the line 5—5 of Fig. 2.

Referring to the drawings a rotary type lawn mower is shown generally at 10 to illustrate the use of this invention. A vertically disposed shaft 12 (Fig. 2) extends from the motor 14 below platform 16 and is operatively connected to a blade 18 that rotates in a horizontal plane in a well known manner. It should be pointed out, however, that a vertically disposed shaft is only illustrative and that my coupling indicated generally at 20 may also be used on horizontally disposed shafts for transmission of power between the shaft 12 and blade assembly 18 or equivalent elements.

Coupling 20 comprises a driving plate member 22 which may be of non-magnetic material and which is circular in shape and has a truncated cone-like head or top 24 in which is formed an axial well or recess 26 for receiving the bottom of shaft 12. The bottom side or face 28 is a flat surface which contains the concentrically disposed recess 30 about a neck 31 and the axial opening 33 which communicates with well 26. Imbedded in the face 28 of member 22 are a plurality of permanent magnetic bars 32 extending radially in equal spaced relationship from the outer perimeter 34 of recess 30 to the perimeter 36 of member 22. Each bar 32 is placed so as to minutely project from surface 28 to a recommended height of 1/1000 of an inch. This dimension per se is not critical and may be varied somewhat, the purpose being to accomplish the desired result of assuring that follower bars 50 will abut the magnetic bars 32 when in mating position to leave no air gap that would tend to lessen the force of the magnetic attraction. By eliminating any such air gap, the most efficient pull of the magnetic force is obtained. Another reason for projecting magnetic bars 32 outwardly from surface 28 is to provide a well or depression intermediate these bars so that face 28 of coupling member 22 and face 44 of coupling member 42 will not be in frictional contact with each other during slippage. Thus faces 28 and 44 are actually spaced apart the distance equal to the projection of bars 32 which serve as space members therefor and such space provides a reservoir in which a film or layer of a suitable lubricant can be placed. Bars 32 are all of like thickness and each bar 32 is off-set relative to one of the other bars to respective opposite sides of a line defining a diametric alignment thereof. Thus, for illustration in member 22 as seen in Fig. 4 assuming the direction of rotation is clockwise, each bar 32 will have the leading edge 38 and the trailing edge 40 so that each leading edge 38 of each bar 32 is in diametric alignment with the leading edge 38 of one other bar 32 and the respective trailing edges 40 are offset to opposite sides of such alignment.

The driven plate member 42 of coupling 20 which may also be of non-magnetic material is a disc shaped member having a flat upper surface or face 44 on which there is formed the upstanding concentrically disposed shoulder 46 and the axial opening 48. Also on face 44 there are imbedded a plurality of follower bar members 50 of mild steel or any other suitable material susceptible of being attracted by magnetic forces, which extend radially in equal spaced relationship from the outer perimeter 52 of shoulder 46 to the perimeter 54 of member 42. The number and spacing of follower bars on the driven member 42 is the same as the magnetic bars 32 on the driving member 22 so that such bars will mate or register at times throughout the length of their mating edges in an abutting relationship. For purpose of description to be made later, bars 50 have a leading edge 55 and trailing edge 56 relative to the direction of rotation. A tapered well 57 is axially placed in the bottom 58 of member 42.

The upper coupling member 22 is mounted on shaft 12 (Fig. 3) so that such shaft is seated in well 26 and keyed thereto as at 60 for rotation therewith. Coupling member 42 is placed on member 22 so that faces 28 and 44 are in juxtaposition and spaced as previously described and such coupling members will be held together when bars 50 are within the field of attraction of bars 32. Shoulder 46 on member 42 is disposed within recess 30 of member 22 and the thickness of such shoulder is less than that of such recess as indicated by the space 62 in Fig. 3. To hold member 42 in position when it is not attached to member 22 by magnetic attraction, a bolt 64 is inserted from the bottom of member 22 through opening 48, through opening 31 in member 22 and is screwably engaged with the bottom portion of shaft 12 which has an internally threaded bore 66 for this purpose. A collar 68 is placed in opening 48 through which bolt 64 passes and a washer 70 on the bolt bears against one end of this collar with the other end of the collar bearing against the bottom of neck 31 in member 22 to supplement key 60 in holding member 22 fast to shaft 12. Member 42 is designed to rotate about collar 68 and on that portion of washer 70 radially extending beyond such collar.

The head portion 72 of bolt 64 is countersunk in well 57 so as not to interfere with a suitable blade assembly 18 that is mounted diametrically across bottom of member 44 (Fig. 2) and attached thereto by any suitable means such as bolts 74.

In mounting the magnetic bars 32 to coupling member 22 as described the north and south poles respectively of each bar are preferably similarly positioned by all like poles being either at the perimeter or axis to give the greatest magnetic attraction. Such poles may be alternated as to pole position or some of such poles can be reversed relative to the others or to pole positions but any arrangement different from that preferably used will of course diminish the force of magnetic attraction.

Under normal design loads, power will be delivered through the clutch or coupling 20 without interruption as the follower bars 50 will be held in mating position with magnetic bars 32 by magnetic attraction forces of the permanent magnetic field which are strong enough to pull the load torque along. When the load increases to a high enough value to overcome the holding force of the magnetic attraction, as by the blade assembly 18 striking an object, coupling member 22 under power of the motor 14 will slip away from member 42 causing lateral displacement of bars 32 and 50 relative to each other. The point of release is sharp and defined and provides a limiting device between the power supply and load as a safety element. When the load is reduced or decreased to a point where the force causing slippage is less than the magnetic attraction of the coupling, the poles of the permanent magnets automatically create mating poles in the paramagnetic followers and coupling sections 22 and 42 lock together in unity coupling which is then maintained until a further increase in the load value as described. Such an automatic reset feature of this coupling is an important feature of this invention.

In the de-coupling action of member 20 as described it is important that members 22 and 42 separate simultaneously or substantially so and since bars 32 and 50 are radially disposed, I have offset each bar 32 relative to a diametric alignment with one other like bar as described. By this arrangement when bars 32 and 50 are in mating position, they are centered over one another and the only opposition to movement is the surface friction of one bar against another held tightly together by magnetic attraction. When an external force, such as member 18 striking an object, results in slippage between members 22 and 42, the exposed area between bars 32 and 50 becomes progressively smaller until only the trailing edges 40 of bars 32 are in contact respectively with the leading edges 55 of bars 50. As such exposed area between bars 32 and 50 become smaller, the magnetic energy becomes more concentrated and the magnetic density per unit area causes greater attraction of the parts so that the attractive forces are at their peak just prior to separation of bars 32 and 50. When these bars separate under the external force, the magnetic forces diminish rapidly allowing the parts to become uncoupled. Since bars 32 and 50 are on a radius, it will thus be appreciated that offsetting bars 32 as described affords a substantially simultaneous breaking along the trailing edge 40 of bars 32 and the leading edge 55 of bars 50.

From the above description it will be appreciated that a load may be magnetically coupled to a power source so that when such load becomes greater than the designed load for a source of power, de-coupling will take place automatically and be maintained until the load subsequently assumes a safe design value at which time re-coupling is automatically accomplished.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof.

I claim:

1. A magnetic slip coupling, comprising a driving member designed to be concentrically mounted to the end portion of a power driven shaft for rotation therewith, a face on said driving member, a plurality of permanent magnetic bars imbedded in said face and radially disposed in spaced relationship, a driven member designed to be concentrically mounted to said power driven shaft for rotation independently thereof, a face on said driven member, a plurality of magnetically attractable bars imbedded in the face of said driven member and radially disposed in spaced relationship, the bars on each of said faces being the same in number and positioned for mating in an abutting relationship whereby said driving and driven members are coupled by magnetic attraction, said driven member designed to carry a cutting blade, and said driving and driven members automatically becoming uncoupled so that the driving member is rotatable independently of said driven member when the load encountered by the latter is greater than the holding force of the magnetic attraction.

2. A magnetic slip coupling, comprising a driving member, a face on said driving member, a plurality of permanent magnetic bars imbedded in said face and radially disposed in spaced relationship, a driven member, a face on said driven member, a plurality of magnetically attractable bars imbedded in the face of said driven member and radially disposed in spaced relationship, the faces of said driving and driven members in juxtaposition with the bars on each of said faces being the same in number and positioned for mating in an abutting relationship whereby said driving and driven members are coupled by magnetic attraction, means designed to concentrically mount said driving member to a power driven shaft for rotation therewith and to similarly mount said driven member thereto for rotation independently thereof, and said driving and driven members automatically becoming uncoupled so that the driving member is rotatable independently of said driven member when the load encountered by the latter is greater than the holding force of the magnetic attraction.

3. A device as defined in claim 2 characterized by each of said magnetic bars having a leading and trailing edge respectively relative to the direction of rotation, and the leading edge of each magnetic bar being in diametric alignment with the leading edge of one of the other like magnetic bars.

4. A magnetic slip coupling, comprising a driving member, a face on said driving member, a plurality of permanent magnetic bars imbedded in said face and radially disposed in spaced relationship, a driven member, a face on said driven member, a plurality of magnetically attractible bars imbedded in the face of said driven member and radially disposed in spaced relationship, the faces of said driving and driven members in juxtaposition with the bars on each of said faces being the same in number and positioned for mating in an abutting relationship whereby said driving and driven members are coupled by magnetic attraction, each of said magnetic bars having a leading and trailing edge respectively relative to the direction of rotation, the leading edge of each magnetic bar being in diametric alignment with the leading edge of one of the other like magnetic bars, each bar on said driven member being in diametric alignment with one of the other like bars thereon, means designed to concentrically mount said driving member to a power driven shaft for rotation therewith and to similarly mount said driven member thereto for rotation independently thereof, and said driving and driven members automatically becoming uncoupled so that the driving member is rotatable independently of said driven member when the load encountered by the latter is greater than the holding force of the magnetic attraction.

5. A magnetic slip coupling, comprising a driving member, a face on said driving member, a plurality of permanent magnetic bars imbedded in said face and radially disposed in spaced relationship, each of said bars minutely projecting from said face, a driven member, a face on said driven member, a plurality of magnetically attractible bars imbedded in the face of said driven member and radially disposed in spaced relationship, the faces of said driving and driven members in juxtaposition with the bars on each of said faces being the same in number and positioned for mating in an abutting relationship whereby said driving and driven members are coupled by magnetic attraction, means designed to concentrically mount said driving member to a power driven rotatable member for rotation therewith and to similarly mount said driven member thereto for rotation independently thereof, said driving and driven members automatically becoming uncoupled so that the driving member is rotatable independently of said driven member when the load encountered by the latter is greater than the holding force of the magnetic attraction, and the projection of said magnetic bars from the face of said driving member serving as a spacer means to prevent frictional contact between said faces during such independent rotation.

6. A device as defined in claim 5 wherein the space between said faces of said driving and driven members serves as a reservoir for a suitable lubricant.

7. A magnetic slip coupling, comprising a driving member, a face on said driving member, a plurality of permanent magnetic bars imbedded in said face and radially disposed in spaced relationship, each of said bars minutely projecting from said face, a driven member, a face on said driven member, a plurality of magnetically attractible bars imbedded in the face of said driven member and radially disposed in spaced relationship, the faces of said driving and driven members in juxtaposition with the bars on each of said faces being the same in number and positioned for mating in an abutting relationship whereby said driving and driven members are coupled by magnetic attraction, each of said magnetic bars having a leading and trailing edge respectively relative to the direction of rotation, the leading edge of each magnetic bar being in diametric alignment with the leading edge of one of the other like magnetic bars, each bar on said driven member being in diametric alignment with one of the other like bars thereon, means designed to concentrically mount said driving member to a power driven rotatable member for rotation therewith and to similarly mount said driven member thereto for rotation independently thereof, said driving and driven members automatically becoming uncoupled so that the driving member is rotatable independently of said driven member when the load encountered by the latter is greater than the holding force of the magnetic attraction, the projection of said magnetic bars from the face of said driving member serving as a spacer means to prevent frictional contact between said faces during such independent rotation, and said driving and driven members automatically re-coupling when the load on the driven member causing the slippage becomes less than the force of magnetic attraction.

8. A magnetic slip coupling, comprising a generally disc shaped driving and driven member respectively, a face member on said respective driving and driven member, a plurality of permanent magnetic bars imbedded in the face of said driving member and radially disposed in spaced relationship, a plurality of magnetically attractible bars similarly disposed on the face of said driven member, said driving and driven members each designed for concentric mounting on a power driven shaft in face to face relationship, said driving member designed for rotation with said shaft, said driven member designed for rotation independently of said shaft and said driving member at times, and said bars on said respective faces being in a mating abutting relationship at all times except during slippage due to an overload on said driven member.

9. A magnetic slip coupling, comprising a driving member designed to be concentrically mounted to the end portion of a power driven shaft for rotation therewith, a face on said driving member, a plurality of permanent magnetic bars imbedded in said face and radially disposed in spaced relationship, a driven member designed to be concentrically mounted to said power driven shaft for rotation only independently thereof, a face on said driven member, a plurality of magnetically attractible bars imbedded in the face of said driven member and radially disposed in spaced relationship, and the bars on each of said faces being the same in number and positioned for mating in an abutting relationship whereby said driving and driven members are coupled by magnetic attraction.

10. A magnetic slip coupling, comprising a generally disc shaped driving and driven member respectively, a face member on said respective driving and driven member, a plurality of permanent magnetic bars imbedded in the face of said driving member and radially disposed in spaced relationship, each of said bars minutely projecting from said face, a plurality of magnetically attractible bars similarly disposed on the face of said driven member, said driving and driven members each designed for concentric mounting on a power driven shaft in face to face relationship with said projecting portion of said magnetic bars serving as spacer means to maintain said faces from frictional contact with each other, said driving member designed for rotation with said shaft, said driven member designed for rotation independently of said shaft and said driving member at times, and said bars on said respective faces being in a mating abutting relationship at all times except during slippage due to an overload on said driven member.

11. A device as defined in claim 10 wherein the space between said faces of said driving and driven members serves as a reservoir for a suitable lubricant.

References Cited in the file of this patent

UNITED STATES PATENTS

| | | |
|---|---|---|
| 2,147,204 | Laird | Feb. 14, 1939 |
| 2,437,871 | Wood | Mar. 16, 1948 |
| 2,746,691 | Hoad | May 22, 1956 |